(12) United States Patent
Mayette et al.

(10) Patent No.: US 7,488,215 B2
(45) Date of Patent: Feb. 10, 2009

(54) MULTI-POSITION CONNECTOR FOR PERSONAL AUDIO SET

(75) Inventors: Donald Mayette, Vancouver, WA (US); Robert Jacobson, Camas, WA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 0 days.

(21) Appl. No.: 11/259,956

(22) Filed: Oct. 26, 2005

(65) Prior Publication Data

US 2007/0141898 A1 Jun. 21, 2007

Related U.S. Application Data

(60) Provisional application No. 60/622,874, filed on Oct. 26, 2004.

(51) Int. Cl.
*H01R 25/00* (2006.01)
(52) U.S. Cl. .................. 439/638; 439/171; 439/640
(58) Field of Classification Search .............. 439/131, 439/171–173, 270, 640, 638
See application file for complete search history.

(56) References Cited

U.S. PATENT DOCUMENTS 5,247,293 A * 9/1993 Nakagawa ............ 340/825.25
6,148,353 A 11/2000 Cho
6,188,572 B1 2/2001 Liao et al.
6,394,813 B1 * 5/2002 Stout et al. .................... 439/11
6,945,803 B2 * 9/2005 Potega .......................... 439/218
7,125,265 B2 * 10/2006 Weng .......................... 439/131
2006/0052144 A1 * 3/2006 Seil et al. ................. 455/575.1
2006/0087493 A1 * 4/2006 Yeh ............................ 345/156

OTHER PUBLICATIONS

International Search Report; PCT App. No. PCT/US05/38877, Oct. 26, 2005; 2 pages.
Written Opinion of the International Searching Authority; PCT App. No. PCT/US05/38877, Oct. 26, 2005; 3 pages.
Notification of Transmittal of International Search Report and Written Opinion; PCT App. No. PCT/US05/38877, Oct. 26, 2005; 1 page.

* cited by examiner

*Primary Examiner*—Tho D Ta
*Assistant Examiner*—Travis Chambers
(74) *Attorney, Agent, or Firm*—Townsend and Townsend and Crew LLP

(57) ABSTRACT

A multi-position connector is disclosed that allows a personal audio device to be operably secured to a variety of different personal audio sets. In a disclosed embodiment, the connector is slidably secured to a frame, thereby allowing the connector's position relative to the frame to be adjusted as needed so as to properly engage mating connectors on a particular personal audio set. A resistive detent is preferably provided at key locations along the frame so as to hold the connector at a predetermined position relative to the frame.

18 Claims, 4 Drawing Sheets

MULTI-POSITION CONNECTOR FOR PERSONAL AUDIO SET

CROSS REFERENCE TO RELATED APPLICATIONS

This application claims priority to U.S. provisional patent application Ser. No. 60/622,874 filed on Oct. 26, 2004.

FIELD OF THE INVENTION

The present invention relates to a connector preferably for a personal audio set that may be positioned to at least a plurality of different locations.

BACKGROUND OF THE INVENTION

Personal audio devices, commonly known as headphones, earphones, headsets, and the like, are gaining in popularity. The typical personal audio device includes a frame containing an earphone that is usually positioned over or in a wearer's ear. In cases where the audio-set is a headset, a microphone is also typically positioned near the wearer's mouth.

Personal audio devices are often sold as after-market items for use with audio sets, such as MP3 players, CD players, cell phones, and the like, that consumers have purchased separately. These personal audio sets usually include a jack or connector that allow for connection of personal audio devices such as headphones and the like. Usually, different manufacturers of a type of audio set have different shaped and/or configured jacks. In addition, even for a given manufacturer of an audio set having a common jack design for all of its products, the location of that jack on the case may be different between different products of that manufacturer. Accordingly, a manufacturer of after-market products for use on personal audio sets and the like, must design and produce different after-market products, one for each particular audio set to which it is intended to be used.

For example, the Apple Corporation of Cupertino, Calif. offers at least two different personal audio sets. One is sold under the trademark IPOD and the other is sold under the trademark IPOD MINI. They are both audio sets commonly known as MP3 players, but they differ in their physical size and the amount and type of features they offer. Both have the same sized and shaped remote port and headphone jack, each of which is operable using the same or very similar electrical circuitry and the like. However, the physical location of this port and jack on these products differ. The personal audio device sold under the trademark IPOD has its remote port and headphone jack in the center of the top side of the device, and the personal audio device sold under the trademark IPOD MINI has its remote port and headphone jack toward the right side of the top side of the device.

Accordingly, if a manufacturer desires to provide an after-market product that engages the remote port and/or headphone jacks on both the IPOD and the IPOD MINI audio sets, it must make and sell two different audio device-engaging structures. One structure physically aligns the connectors with the IPOD and a separate structure physically aligns the connectors with the IPOD MINI. These two separate structures increase the costs of producing the after market product. Moreover, should the manufacturer of the personal audio set change the location of its ports and jacks, the after-market manufacturer must necessarily change its after market products accordingly.

SUMMARY OF THE INVENTION

Accordingly, despite the available improvements offered by after-market products for use with personal audio sets, there remains a need for a cost-effective and common connector design that allows the after-market product to be operably secured to a variety of different personal audio sets. In addition to other benefits that will become apparent in the following disclosure, the present invention fulfills these needs.

The present invention is a multi-position connector for a personal audio set. In a preferred embodiment, the connector is slidably secured to a frame, thereby allowing the connector's position relative to the frame to be adjusted as needed so as to properly engage mating connectors on a particular personal audio set.

A resistive detent is preferably provided at key locations along the frame so as to hold the connector at a predetermined position relative to the frame.

DETAILED DESCRIPTION OF PREFERRED EMBODIMENTS

Figure 1:
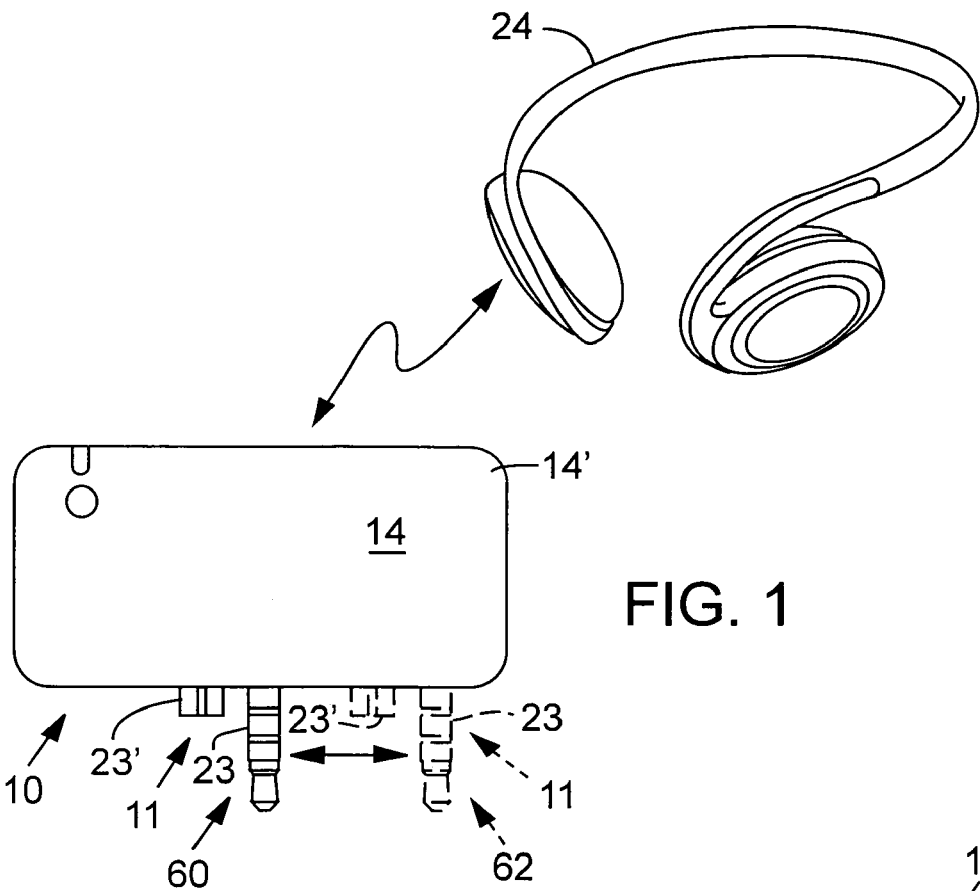
FIG. 1 is a top view of a multi-positionable connector for a personal audio device having a movable connector portion extending therefrom in accordance with an embodiment of the present invention showing a possible first position of the connector portion in solid lines and a possible second position of the connector portion in hidden lines.
Figure 2A:
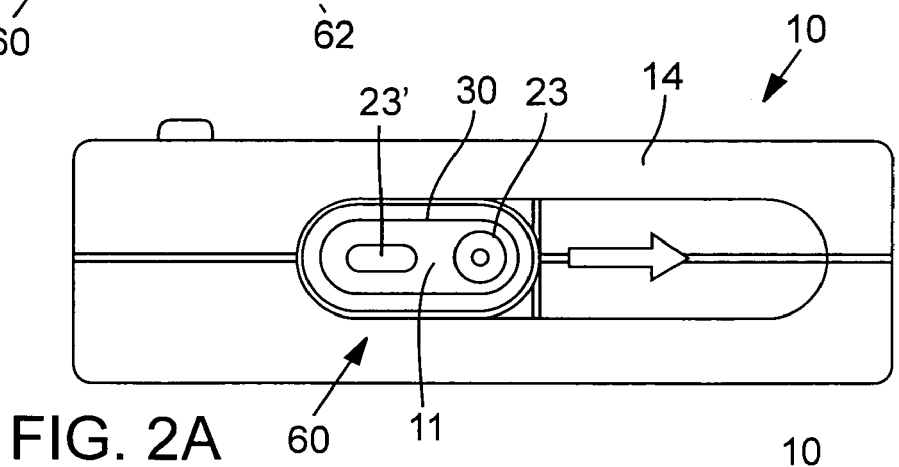
FIG. 2A is a front view of the connector of FIG. 1 with the connector portion in the possible first position.
Figure 2B:
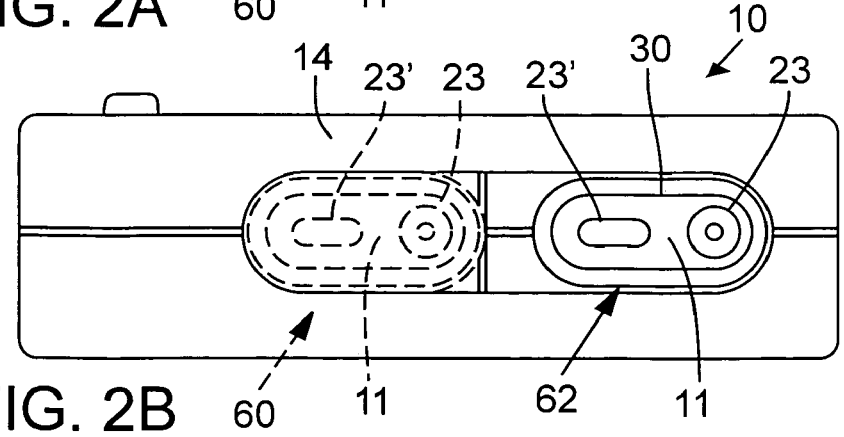
FIG. 2B is a front view of the connector of FIG. 1 with the connector portion in a possible second position and showing the possible first position of the connector portion in broken lines.
Figure 3:
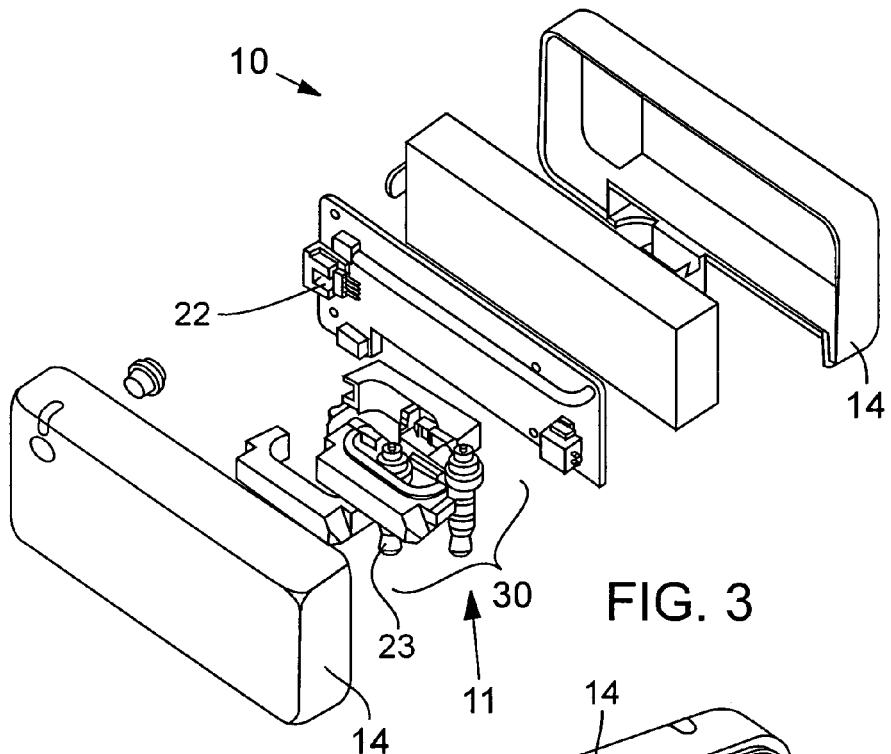
FIG. 3 is an exploded, isometric view of the connector of FIG. 1 showing the connector portion in the first possible position of FIG. 1.

A multi-position connector 10 for connecting an auxiliary device, such as a wireless headset 24, to a personal audio set 12 (FIGS. 6 & 7) is disclosed in FIGS. 1-7.

Preferably, the multi-position connector 10 has a connector portion 11 that is operably secured within a frame 14. The connector portion 11 is sized and shaped to operably engage one or more mating connector(s) 20 on the personal audio set 12 or the like. For example, electrical circuitry 22 for a dongle 14' for operating a wireless headset 24 is contained within the frame 14 and in electrical communication with one or more jack connectors 23, 23' secured within the connector portion 11. Each jack connector 23, 23' is sized to operably connect with an auxiliary device jack 20' (FIGS. 6 & 7) and/or remote port 20" (FIGS. 6 & 7) of the personal audio set 12.

Figure 4:
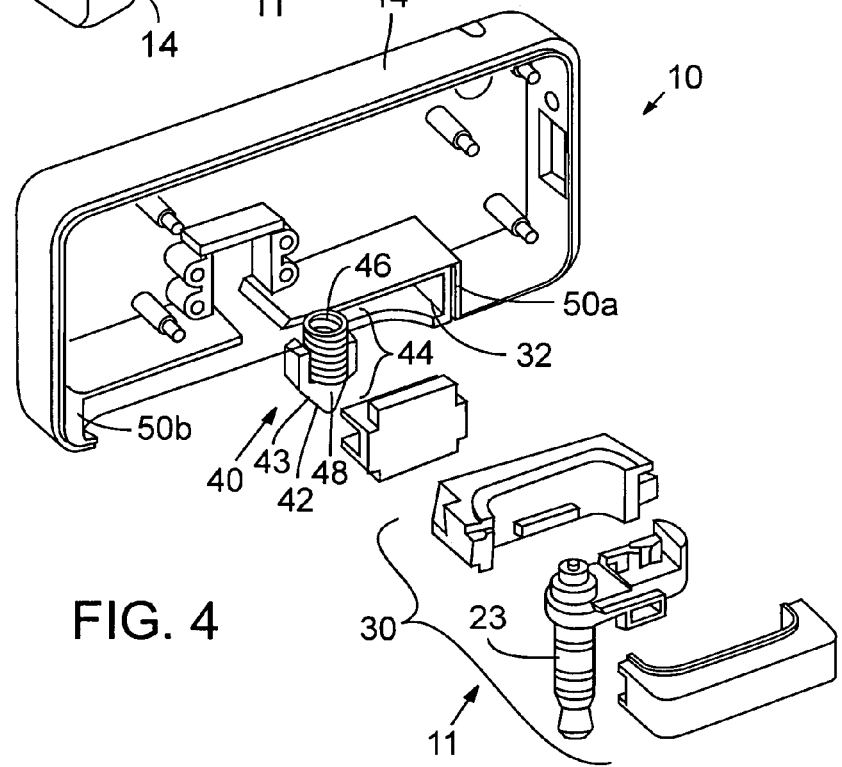
FIG. 4 is an exploded, isometric view of the connector of FIG. 1, showing a detailed view of a possible connector portion having shuttle assembly and resistive detent in accordance with an embodiment of the present invention.
Figure 5:
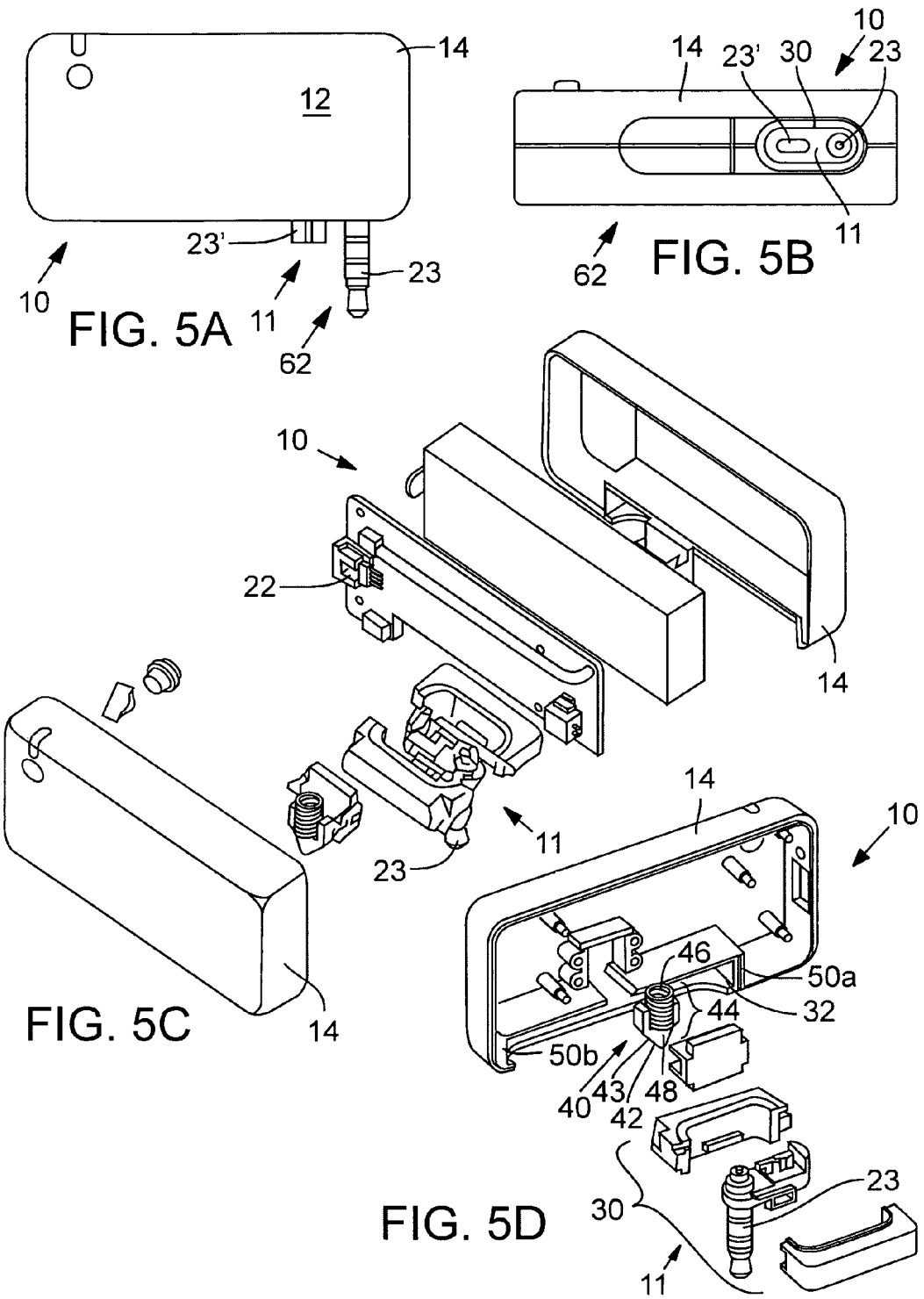
FIG. 5A shows a top view of the connector in FIG. 1 with the connector portion in the second possible position.
FIG. 5B shows a front view of the connector of FIG. 5A.
FIG. 5C is an exploded, isometric view of the connector of FIG. 5A showing the connector portion in the second possible position of FIG. 1.
FIG. 5D is an exploded, isometric view of the connector of FIG. 5A, showing a detailed view of the shuttle assembly in FIG. 4 in accordance with an embodiment of the present invention.

The connector portion 11 is preferably slidably secured to the frame 14. For example and as best shown in FIGS. 4 and 5D, the connector portion 11 is received within a shuttle assembly 30 that travels along a mating channel 32 within the frame 14 thereby allowing the connector portion 11 to slide along the channel. 32

More preferably, a resistive detent 40 is provided so as to hold the connector portion 11 at a predetermined position relative to the frame 14. For example, as best shown in FIG. 4, the resistive detent 40 can include a sliding member 42 biased to extend into the channel 32. Such biasing structure 44 preferably includes a spring 46 or the like. The engaging surface 48 of the sliding member is preferably angled as shown so as to urge the shuttle assembly 30 toward one end 50a, 50b of the channel 32, thereby holding the shuttle assembly 30 in place in either a first position 60 (shown in FIGS. 1, 2A, 3, 4, & 6) or a second position 62 (shown in FIGS. 2B, 5A-D, and 7).

Figures 6, 7:
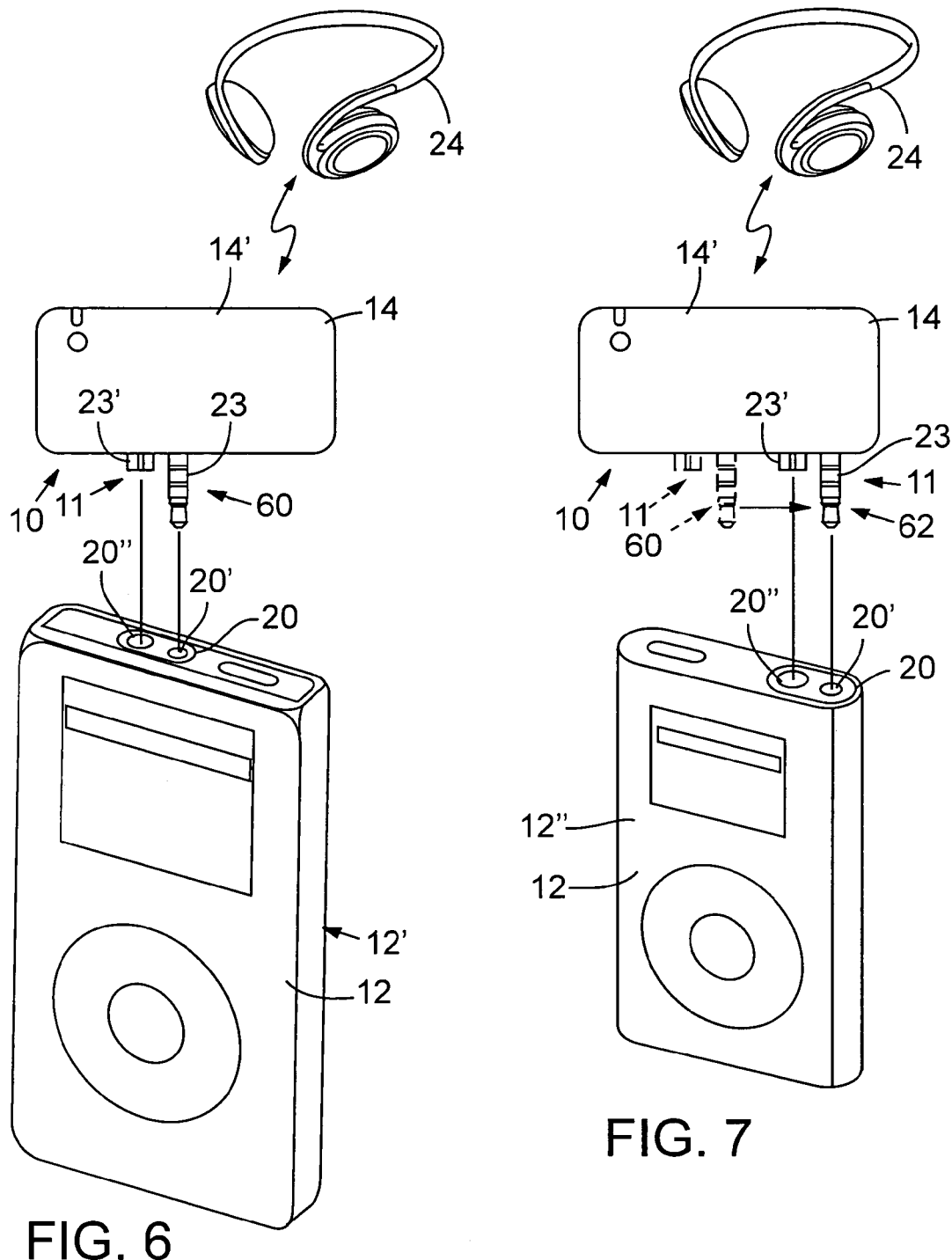
FIG. 6 shows the connector of FIG. 1 with the connector portion in the possible first position and operably secured to a first personal audio set.
FIG. 7 shows the connector of FIG. 1 with the connector portion in the second position and operably secured to a second personal audio set having mating connectors in a different location that the location of the connectors on the first personal audio set of FIG. 6.

Since the position of the connector portion 11 relative to the frame 14 is adjustable, the connector 10 can be used on different personal audio sets. For example, as shown in FIGS. 6 & 7, the connector 10 can be connected to a conventional IPOD 12' personal audio device by placing the connector portion 11 in its first position 60 and connecting the connector portion 11 to the mating connectors on the IPOD 12' personal audio device.

Should a user desire to use the connector 10 on an audio device having a different location for its connectors, such as on an IPOD MINI 12" personal audio device shown in FIG. 8, the user slides the connector portion 11 to its second position 62 as shown in FIG. 8, thereby aligning the connector portion 11 with the mating connectors on the IPOD MINI 12".

Accordingly, the same connector 10 can be used with a variety of different personal audio sets. Moreover, the adjustability of the connector allows a manufacturer of after market products and the like to easily adjust the location of the connector should the manufacturer of a personal audio device move the physical position of a mating connector in future models or the like.

Having described and illustrated the principles of our invention with reference to a preferred embodiment thereof, it will be apparent that the invention can be modified in arrangement and detail without departing from such principles. In view of the many possible embodiments to which the principles may be put, it should be recognized that the detailed embodiment is illustrative only and should not be taken as limiting the scope of our invention. For example, the disclosed embodiment describes the personal audio set being an MP3 player, and the connector 10 being a wireless dongle for a headset, the principles of this invention apply equally well with other types of personal audio. sets, such as cell-phones, CD players, cassette players, and the like and with both wired and wireless after-market products connected to the connector 10. Accordingly, we claim as our invention all such modifications as may come within the scope and spirit of the following claims and equivalents thereto.

The invention claimed is:

1. A multi-positionable connector for operably connecting an auxiliary device to a jack on a personal audio set, the connector having:
    a frame configured to at least partially enclose any one of a plurality of personal audio sets,
    a connector portion operably and translationally secured to the frame, said connector portion moveable with respect to the frame to define a first position relative to the frame and at least a second position relative to the frame, wherein the multi-positionable connector is capable of adjustment from one of the first position and the second position to an other of the first position and the second position by translational movement of the connector portion with respect to the frame; and,
    a jack connector secured to the connector portion for operably engaging the auxiliary jack on the personal audio set when the connector portion is in at least one of said first position and said second position, thereby operably connecting the personal audio set to the auxiliary device.

2. The multi-positionable connector of claim 1, wherein said frame includes electrical circuitry received therein for operating said auxiliary device, and said jack connector electrically connects said personal audio set to said electrical circuitry.

3. The multi-positionable connector of claim 1, wherein the personal audio set is an MP3 player.

4. The multi-positionable connector of claim 1, further including a shuttle translationally secured to said frame and said connector portion is operably secured to said shuttle.

5. The multi-positionable connector of claim 1, further including a resistive detent for biasing said connector portion toward one of said first position and said second position.

6. The multi-positionable connector of claim 1, wherein said frame encloses a wireless dongle for operating said auxiliary device, wherein the auxiliary device is a headset.

7. The multi-positionable connector of claim 1, wherein the auxiliary device is a headset.

8. The multi-positionable connector of claim 7, wherein the headset is wirelessly connected to said connector portion.

9. The multi-positionable connector of claim 1, wherein at least one of the first position and the second position is aligned with a position of the jack on the personal audio set.

10. The multi-positionable connector of claim 9, wherein said translationally secured connector portion allows the alignment of the frame of the connector with a frame of the personal audio set.

11. An auxiliary audio device for connecting to at least a first personal audio set and a second personal audio set, the first and second audio sets each having a case with an auxiliary device connection jack located thereon with each auxiliary device connection jack being located at different locations on each case, said auxiliary device comprising:
    a frame;
    a connector portion operably and translationally secured to the frame, said connector portion moveable with respect to the frame to define a first position relative to the frame and at least a second position relative to the frame, wherein the auxiliary device is capable of adjustment from one of the first position and the second position to an other of the first position and the second position by translational movement of the connector portion with respect to the frame;

a jack connector secured to the connector portion for operably engaging, one at a time, the first personal audio set and the second personal audio set;

said jack connector positioned to operably engage the auxiliary device connector jack of the first personal audio set when the connector portion is in the first position; and, said jack connector positioned to operably engage the auxiliary device connector jack of the second personal audio set when the connector portion is in said second position.

12. The auxiliary audio device of claim 11 wherein said frame includes electrical circuitry received therein for operating the auxiliary audio device, and said jack connector electrically connects one of said first and second personal audio sets to said electrical circuitry.

13. The auxiliary audio device of claim 11, wherein at least one of said first and second personal audio sets is an MP3 player.

14. The auxiliary audio device of claim 11, wherein one of the first position and the second position is aligned with the auxiliary device connector jack of the first personal audio set and an other of the first position and the second position is aligned with the auxiliary device connector jack of the second personal audio set.

15. The auxiliary audio device of claim 11, further including a shuttle translationally secured to said frame and said connector portion is operably secured to said shuttle.

16. The auxiliary audio device of claim 11, further including a resistive detent for biasing said connector portion toward one of said first position and said second position.

17. The auxiliary audio device of claim 11, wherein said auxiliary audio device is a headset.

18. The auxiliary audio device of claim 17, wherein said headset is wirelessly connected to said connector portion.

* * * * *